(12) United States Patent
Pretz et al.

(10) Patent No.: US 10,589,242 B2
(45) Date of Patent: Mar. 17, 2020

(54) FLUID CATALYTIC REACTORS WHICH INCLUDE FLOW DIRECTORS

(71) Applicant: Dow Global Technologies LLC, Midland, MI (US)

(72) Inventors: Matthew T. Pretz, Freeport, TX (US); Mark W. Stewart, Houston, TX (US); Ben J. Freireich, Midland, MI (US); Madhusudhan Kodam, Midland, MI (US); Brien A. Stears, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/346,586

(22) PCT Filed: Oct. 25, 2017

(86) PCT No.: PCT/US2017/058204
§ 371 (c)(1),
(2) Date: May 1, 2019

(87) PCT Pub. No.: WO2018/085084
PCT Pub. Date: May 11, 2018

(65) Prior Publication Data
US 2019/0255498 A1 Aug. 22, 2019

Related U.S. Application Data

(60) Provisional application No. 62/416,553, filed on Nov. 2, 2016.

(51) Int. Cl.
*B01J 8/34* (2006.01)
*B01J 8/26* (2006.01)
(Continued)

(52) U.S. Cl.
CPC .......... *B01J 8/0055* (2013.01); *B01J 8/0065* (2013.01); *B01J 8/26* (2013.01); *B01J 8/34* (2013.01);
(Continued)

(58) Field of Classification Search
CPC ..... B01J 8/0055; B01J 8/34; B01J 8/26; B01J 8/0065; B01J 2208/00849;
(Continued)

(56) References Cited

U.S. PATENT DOCUMENTS 3,778,038 A * 12/1973 Eversole .................. F02M 7/18
261/50.1
4,579,716 A 4/1986 Krambeck et al.
(Continued)

FOREIGN PATENT DOCUMENTS

WO 2008080357 A1 7/2008

OTHER PUBLICATIONS

International Search Report and Written Opinion pertaining to PCT/US2017/058989, dated Feb. 14, 2018.
(Continued)

*Primary Examiner* — Huy Tram Nguyen
(74) *Attorney, Agent, or Firm* — Dinsmore & Shohl LLP (57) ABSTRACT

According to one or more embodiments, a fluid catalytic reactor may include a riser, a lower reactor portion, a transition portion, and a flow director. The riser may include a cross-sectional area, and the lower reactor portion may include a cross-sectional area. The transition portion may attach the riser to the lower reactor portion. The cross-sectional area of the riser may be less than the cross-sectional area of the lower reactor portion such that the transition portion is tapered inward from the lower reactor portion to the riser. The flow director may be positioned at least within an interior region of the transition portion. The
(Continued)

flow director may include a body which affects the velocity profile of fluids moving from the lower reactor portion to the riser.

15 Claims, 4 Drawing Sheets

(51) Int. Cl.
*B01J 8/00* (2006.01)
*C10G 11/18* (2006.01)

(52) U.S. Cl.
CPC ....... *C10G 11/18* (2013.01); *B01J 2208/0084* (2013.01); *B01J 2208/00548* (2013.01); *B01J 2208/00849* (2013.01); *B01J 2208/00938* (2013.01)

(58) Field of Classification Search
CPC ...... B01J 2208/0084; B01J 2208/00548; B01J 2208/00938; C10G 11/18
USPC ........................................................ 422/214
See application file for complete search history.

(56) References Cited

U.S. PATENT DOCUMENTS

| | | | |
|---|---|---|---|
| 4,717,467 A * | 1/1988 | Haddad | C10G 11/18 208/113 |
| 5,190,650 A | 3/1993 | Tammera et al. | |
| 5,275,641 A | 1/1994 | Tammera et al. | |
| 6,069,012 A | 5/2000 | Kayser | |
| 6,166,282 A | 12/2000 | Miller | |
| 6,655,664 B2 * | 12/2003 | Chuang | F15D 1/02 261/62 |
| 7,169,293 B2 | 1/2007 | Lomas et al. | |
| 7,396,971 B2 | 7/2008 | Smith et al. | |
| 7,575,725 B2 | 8/2009 | Lomas et al. | |
| 7,758,817 B2 | 7/2010 | Hedrick et al. | |
| 7,902,416 B2 | 3/2011 | Glover et al. | |
| 9,815,040 B2 | 11/2017 | Pretz et al. | |
| 2006/0177357 A1 | 8/2006 | Yuan et al. | |
| 2009/0120629 A1 | 5/2009 | Ashe | |
| 2010/0320121 A1 | 12/2010 | Bauman et al. | |
| 2012/0211402 A1 | 8/2012 | Monaghan et al. | |
| 2013/0150233 A1 * | 6/2013 | Wolschlag | B01J 8/26 502/100 |
| 2013/0252805 A1 * | 9/2013 | Palmas | B01J 29/90 502/180 |
| 2014/0115871 A1 | 5/2014 | Guidat et al. | |
| 2014/0115952 A1 | 5/2014 | Wang et al. | |
| 2016/0272559 A1 | 9/2016 | Pretz et al. | |

OTHER PUBLICATIONS

International Search Report and Written Opinion pertaining to PCT/US2017/058204, dated Feb. 7, 2018.
International Preliminary Report on Patentability pertaining to PCT/US2017/058989, dated May 16, 2019.
International Preliminary Report on Patentability pertaining to PCT/US2017/058204, dated May 16, 2019.
Notice of Allowance and Fee(s) Due dated Aug. 12, 2019 pertaining to U.S. Appl. No. 16/346,626, filed May 1, 2019, 16 pgs.

* cited by examiner

FLUID CATALYTIC REACTORS WHICH INCLUDE FLOW DIRECTORS

CROSS REFERENCE TO RELATED APPLICATION

This application claims priority to U.S. Provisional Application 62/416,553, filed Nov. 2, 2016, which is incorporated herein by reference in its entirety.

BACKGROUND

Field

The present disclosure generally relates to reactor units for chemical processing, and more specifically, to reactors for fluid catalytic reactions.

Technical Background

Fluid catalytic reactions, such as fluid catalytic cracking (FCC) reactions, may take place in fluid catalytic reactor systems. Generally, a fluid catalytic reactor system may include a fluid catalytic reactor and a regeneration unit. A fluid catalytic reactor may convert a feedstock chemical into the product chemical by contact with a fluidized particulate catalyst. During the reaction, the catalyst may become at least partially deactivated or "spent," and have reduced activity in reactions thereafter. Therefore, the spent catalyst may be transferred to the regeneration unit to be regenerated, thus increasing its activity from its spent state and making it available for further catalytic reactions. Following regeneration in the regeneration unit, the regenerated catalyst is transferred back into the fluid catalytic reactor for continued reactions with feedstock chemicals.

Sometimes it may be desired to scale-up at least a portion of a fluid catalytic reactor system, such as the fluid catalytic reactor. The scaled-up fluid catalytic reactor may be designed and constructed based on a smaller, original fluid catalytic reactor. However, scaling-up fluid catalytic reactors may be difficult, as scaling up the fluid catalytic reactor may change the reaction parameters which affect product output. Accordingly, improved methods and/or devices for scaling-up fluid catalytic reactors are needed.

BRIEF SUMMARY

According to one or more embodiments described herein, a fluid catalytic reactor may include a flow director. The flow director may be positioned in a transition portion of a fluid catalytic reactor and may alter the fluid flow in the fluid catalytic reactor relative to a fluid catalytic reactor which does not include a flow director. Specifically, the flow director may restrict fluid flow into a more narrow path as it passes between portions of a fluid catalytic reactor, such as between a lower reactor portion and a riser.

Also described herein are methods for scaling up fluid catalytic reactors. In industry, it may be desirable to scale-up a relatively small fluid catalytic reactor (referred to herein as a "template" fluid catalytic reactor) by building a larger fluid catalytic reactor (referred to herein as a "scaled-up" fluid catalytic reactor) which is based on the design of the template fluid catalytic reactor. For example, data can be collected from the template reactor and process configurations can be enhanced and/or standardized utilizing the template fluid catalytic reactor without the increased capital costs of constructing or operating a larger fluid catalytic reactor.

In some embodiments, the template fluid catalytic reactor and the scaled-up fluid catalytic reactor may include a lower reactor portion and a riser, where the lower reactor portion has a greater cross-sectional area than the riser. Such designs may utilize a transition portion which connects the lower reactor portion to the riser, where the transition portion may taper inward from the lower reactor portion to the riser such that the fluid path from the lower reaction portion to the riser is narrowed over the height of the transition portion.

Generally, a fluid catalytic reactor may be scaled-up by increasing the cross-sectional areas of various portions of the template fluid catalytic reactor approximately by a scale-up factor, where the "scale-up factor" refers to the multiple by which the cross-sectional area is increased in the scaled-up fluid catalytic reactor relative to the template fluid catalytic reactor. For example, fluid catalytic reactors which include a lower reactor portion and a riser may be scaled-up by increasing the cross-sectional area of each of the lower reactor portion and the riser approximately by a scale-up factor. The scale-up factor may be generally a ratio of the capacity of the reactors or the volumetric flow rate of the feed or product. By such a scale-up process, the ratio of the cross-sectional area of the lower reactor portion to the cross-sectional area of the riser in the template fluid catalytic reactor and the scaled-up fluid catalytic reactor may be similar (e.g., within about 20%). Since the ratios are similar, the scaled-up fluid catalytic reactor may perform similarly in reactions to the template fluid catalytic reactor.

However, in such embodiments of the scale-up procedure, when the scale-up occurs, if the transition portion is to maintain its general shape (e.g., angle of taper), it may need to have an increased height (i.e., increased distance between the riser and the lower reactor portion). However, it has been found that increasing the height of the transition portion has an effect on the velocity profile and gas residence time of fluids during operation of the reactor, leading to changes in product output as compared with the template reactor.

It has been discovered that the velocity profile of the scaled-up fluid catalytic reactor in its transition portion can be maintained relative to the template fluid catalytic reactor by providing a flow director within the transition portion of the scaled-up fluid catalytic reactor. The flow director may be a body which takes up space within the transition portion of the scaled-up fluid catalytic reactor and, thus, narrows the path in which fluids may flow between the lower reactor portion and the riser in the scaled-up fluid catalytic reactor. In one or more embodiments, the flow director may serve to make the ratio of the available cross-sectional flow area to the cross-sectional area of the lower reactor portion near the same (e.g., within 30%) at one or more heights of the scaled-up transition portion with respect to the template fluid catalytic reactor. Such a design may standardize the fluid velocity profile of the scaled-up fluid catalytic reactor to that of the template fluid catalytic reactor.

According to one embodiment of the present disclosure, a fluid catalytic reactor may comprise a riser, a lower reactor portion, a transition portion, and a flow director. The riser may comprise a cross-sectional area, and the lower reactor portion may comprise a cross-sectional area. The transition portion may attach the riser to the lower reactor portion. The cross-sectional area of the riser may be less than the cross-sectional area of the lower reactor portion such that the transition portion is tapered inward from the lower reactor portion to the riser. The flow director may be positioned at least within an interior region of the transition portion. The flow director may comprise a body which affects the velocity profile of fluids moving from the lower reactor portion to the riser.

According to another embodiment, a fluid catalytic reactor may be scaled up by a method which may comprise constructing or operating a scaled-up fluid catalytic reactor based on a template fluid catalytic reactor. The scaled-up fluid catalytic reactor may comprise a scaled-up riser, a scaled-up lower reactor portion, a scaled-up transition portion connecting the scaled-up riser and the scaled-up lower reactor portion, and a flow director positioned at least within an interior portion of the transition portion. The template fluid catalytic reactor may comprise a template riser, a template lower reactor portion, and a template transition portion connecting the template riser and the template lower reactor portion. For the midpoint of the height of the scaled-up transition portion, a scaled-up flow-path ratio may be from 70% to 130% of a template flow-path ratio. The scaled-up flow-path ratio for a height may be equal to a ratio of (a) a scaled-up transition portion flow area at the height to (b) the cross-sectional area of the scaled-up lower reactor portion, wherein the scaled-up transition portion flow area for the height is equal to the cross-sectional area of the transition portion at the height minus the cross-sectional area of the flow director at the height. A template flow-path ratio for a height may be equal to: for heights less than a height of the template transition portion, a ratio of (a) a template transition portion flow area at the height to (b) the cross-sectional area of the template lower reactor portion, wherein the template transition portion flow area for a height is equal to the cross-sectional area of the template transition portion at the height; or for heights greater than the height of the template transition portion, a ratio of (a) the cross-sectional area of the template riser to (b) the cross sectional area of the template lower reactor portion.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

It should be understood that the drawings are schematic in nature, and do not include some components of a fluid catalytic reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

According to one or more embodiments, described herein are fluid catalytic reactors which include flow directors positioned within the fluid catalytic reactors. Additionally, described herein are flow directors for use in scaled-up fluid catalytic reactors, as well as processes for scaling up fluid catalytic reactors. Generally, according to one or more embodiments described herein, a template fluid catalytic reactor may be scaled up to form a scaled-up fluid catalytic reactor. The template fluid catalytic reactor may not include a flow director, while the scaled-up fluid catalytic reactor includes a flow director positioned within its transition portion connecting a lower reactor portion to a riser.

Figure 1:
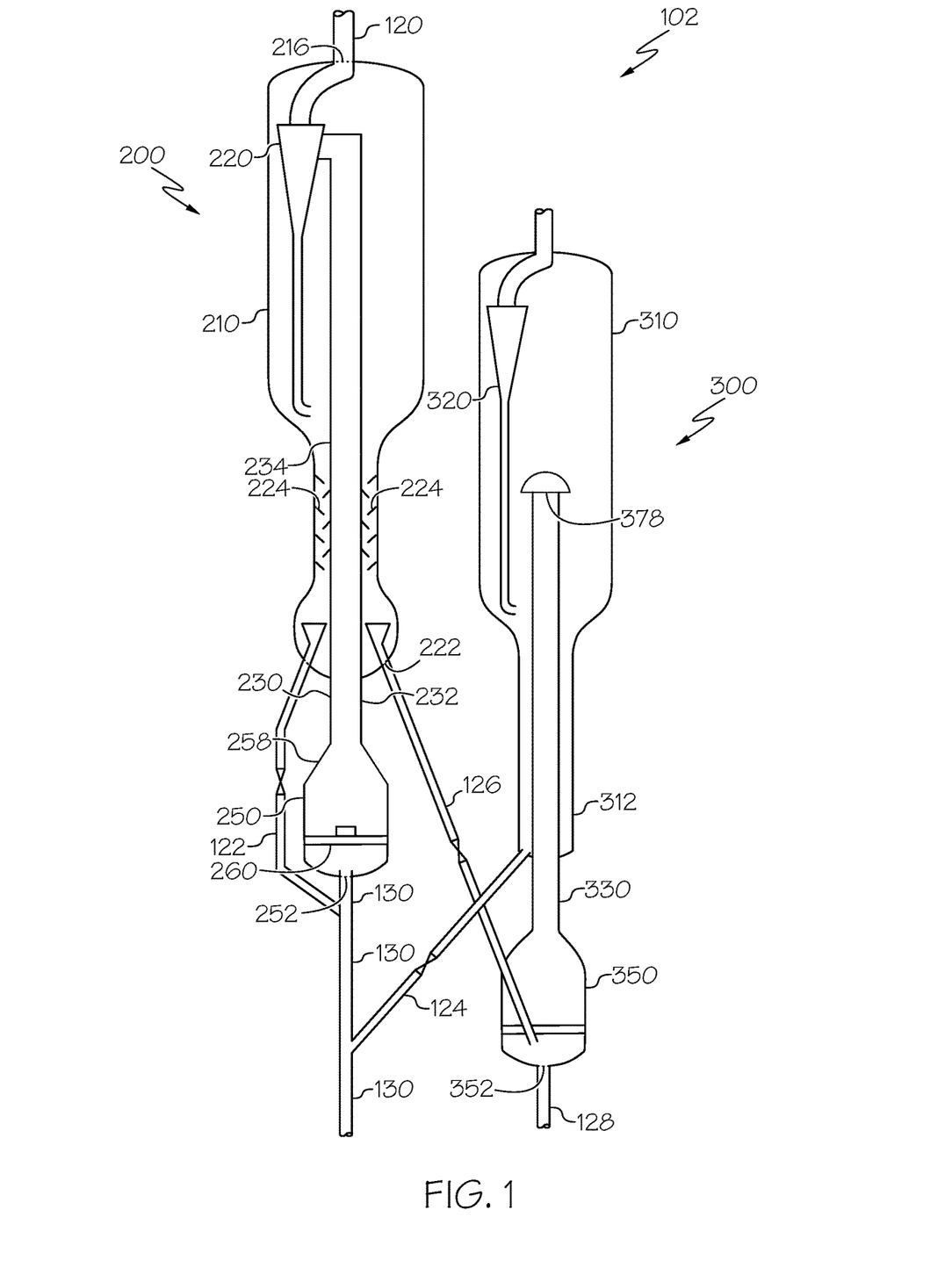
FIG. 1 schematically depicts a fluid catalytic reactor system, according to one or more embodiments disclosed herein.

Referring now to FIG. 1, a fluid catalytic reactor system 102 is schematically depicted. The fluid catalytic reactor system 102 of FIG. 1 may be representative of a template fluid catalytic reactor system or of a scaled-up fluid catalytic reactor system. While according to the embodiments described herein, the scaled-up fluid catalytic reactor includes a flow director, a flow director is not depicted in FIG. 1. The fluid catalytic reactor system 102 generally comprises multiple system components, such as a fluid catalytic reactor 200 and/or a regeneration section 300. As used herein, a "fluid catalytic reactor" generally refers to a reactor which is operable to convert a feed in to a reactant utilizing a fluidized catalyst. With respect to FIG. 1, the fluid catalytic reactor is depicted as the portion of a fluid catalytic reactor system in which the major process reaction takes place. According to some embodiments, the fluid catalytic reactor 200 may also separate catalyst (sometimes spent, meaning it is at least partially deactivated) from the product stream of the reaction. Also, as used herein, a "regeneration section" generally refers to the portion of a fluid catalytic reactor system 102 where the catalyst is regenerated, such as through combustion and, in some embodiments, the regenerated catalyst is separated from the other process materials, such as evolved gases from the combusted material previously on the de-activated catalyst or from supplemental fuel. According to some embodiments, the regeneration section may include a fluid catalytic reactor which regenerates the catalyst.

According to one or more embodiments, as depicted in FIG. 1, the fluid catalytic reactor 200 may include a lower reactor portion 250, a riser 230, and a catalyst separation section 210. The regeneration section 300 may include a combustor 350, a riser 330, and a catalyst separation section 310. In one or more embodiments, the catalyst separation section 210 may be in fluid communication with the combustor 350 (e.g., via standpipe 126) and the catalyst separation section 310 may be in fluid communication with the lower reactor portion 250 (e.g., via standpipe 124 and transport riser 130).

It should be understood that the fluid catalytic reactor system 102 of FIG. 1 is only an example of a fluid catalytic reactor system 102 which includes a fluid catalytic reactor 200. Other embodiments of fluid catalytic reactors are contemplated herein, and fluid catalytic reactors as described herein should not be limited to those which are depicted in FIG. 1 or would be suitable for use in the system of FIG. 1. For example, a fluid catalytic reactor could be a stand-alone device which does not include a regeneration section 300 or a catalyst separation section 210. In another embodiment, a fluid catalytic reactor may be a combustor reactor utilized to regenerate spent catalyst.

According to one or more embodiments, the fluid catalytic reactor system 102 may be operated by feeding one or more chemical feeds and one or more fluidized catalysts into the lower reactor portion 250, and reacting the one or more chemical feeds by contact with the one or more fluidized catalysts to produce one or more chemical products in the lower reactor portion 250 of the fluid catalytic reactor 200. The chemical product(s) and the catalyst may be passed out of the lower reactor portion 250 and through the riser 230 to a separation device 220 in the catalyst separation section 210, where the catalyst is separated from the chemical product, which is transported out of the catalyst separation section 210. The separated catalyst is passed from the catalyst separation section 210 to the combustor 350. In the combustor 350, the catalyst may be regenerated by a chemical process such as combustion. For example, without limitation, the spent catalyst may be de-coked and/or supplemental fuel may be catalytically combusted. The catalyst is then passed out of the combustor 350 and through the riser 330 to a riser termination separator 378, where the gas and solid components from the riser 330 are partially separated. The vapor and remaining solids are transported to a secondary separation device 320 which may consist of multiple primary and secondary cyclones in the catalyst separation section 310 where the remaining catalyst is separated from the gases from the regeneration reaction (e.g., gases emitted by combustion of spent catalyst). The separated catalyst is then passed from the catalyst separation section 310 to the lower reactor portion 250 via standpipe 124 and transport riser 130, where it is further utilized in a catalytic reaction. Thus, the catalyst, in operation, may cycle between the fluid catalytic reactor 200 and the regeneration section 300. In general, the processed chemical streams, including the feed streams and product streams may be gaseous, and the catalyst may be fluidized particulate solid.

According to the embodiments described herein, the fluid catalytic reactor 200 comprises a lower reactor portion 250, a transition portion 258, and a riser 230. The transition portion 258 may connect the lower reactor portion 250 with the riser 230. According to one or more embodiments, the lower reactor portion 250 and the riser 230 may have a substantially constant cross-section area, while the transition portion 258 is tapered and does not have a constant cross-sectional area. As described herein, unless otherwise explicitly stated, the cross-sectional area refers to the area of the cross section of a portion of the reactor part substantially orthogonal to the direction of flow of reactants and/or products. For example, in FIG. 1, the cross sectional area of the lower reactor portion 250, the transition portion 250, and the riser 230 is in the direction of a plane defined by the horizontal direction and the direction into the page (orthogonal to the direction of fluid motion, i.e., vertically upward).

As described herein, the lower reactor portion 250 may include a vessel, drum, barrel, vat, or other container suitable for a given chemical reaction. In one or more embodiments, the lower reactor portion 250 may be generally cylindrical in shaped (i.e., having a substantially circular cross-sectional shape), or may alternately be non-cylindrically shaped, such as prism shaped with cross-sectional shaped of triangles, rectangles, pentagons, hexagons, octagons, ovals, or other polygons or curved closed shapes, or combinations thereof. The lower reactor portion 250, as used throughout this disclosure, may generally include a metallic frame, and may additionally include refractory linings or other materials utilized to protect the metallic frame and/or control process conditions. As depicted in FIG. 1, the lower reactor portion 250 may include a lower reactor portion catalyst inlet port 252 defining the connection of transport riser 130 to the lower reactor portion 250.

The lower reactor portion 250 may be connected to a transport riser 130 which, in operation, may provide regenerated catalyst and/or reactant chemicals to the fluid catalytic reactor 200. The regenerated catalyst and/or reactant chemicals may be mixed with a distributor 260 housed in the lower reactor portion 250. The catalyst entering the lower reactor portion 250 via transport riser 130 may be passed through standpipe 124 to a transport riser 130, thus arriving from the regeneration section 300. In some embodiments, catalyst may come directly from the catalyst separation section 210 via standpipe 122 and into a transport riser 130, where it enters the lower reactor portion 250. This catalyst may be slightly deactivated, but may still, in some embodiments, be suitable for reaction in the lower reactor portion 250.

Still referring to FIG. 1, the fluid catalytic reactor 200 may comprise a riser 230 which acts to transport products from the lower reactor portion 250 to the catalyst separation section 210. In one or more embodiments, the riser 230 may be generally cylindrical in shaped (i.e., having a substantially circular cross-sectional shape), or may alternately be non-cylindrically shaped, such as prism shaped with cross-sectional shaped of triangles, rectangles, pentagons, hexagons, octagons, ovals, or other polygons or curved closed shapes, or combinations thereof. The riser 230, as used throughout this disclosure, may generally include a metallic frame, and may additionally include refractory linings or other materials utilized to protect the metallic frame and/or control process conditions.

According to some embodiments, the riser 230 may include an external riser section 232 and an internal riser section 234. As used herein, an "external riser section" refers to the portion of the riser that is outside of the catalyst separation section, and an "internal riser section" refers to the portion of the riser that is within the catalyst separation section. For example, in the embodiment depicted in FIG. 1, the internal riser section 234 of the fluid catalytic reactor 200 may be positioned within the catalyst separation section 210, while the external riser section 232 is positioned outside of the catalyst separation section 210.

As depicted in FIG. 1, the lower reactor portion 250 may be connected to the riser 230 via the transition portion 258. The lower reactor portion 250 may generally comprise a greater width (e.g., diameter in a generally cylindrical embodiment) than the riser 230. The transition portion 258 may be tapered from the size of the diameter of the lower reactor portion 250 to the size of the diameter of the riser 230 such that the transition portion 258 projects inwardly from the lower reactor portion 250 to the riser 230. As used herein, a "riser width" refers to the largest cross-sectional distance of the riser. For example, a cylindrical riser has a width equal to its diameter, and a rectangular prism shaped riser has a width equal to is the square root of the sum of its first cross-sectional side squared and its second cross-sectional side squared.

In some embodiments, such as those where the lower reactor portion 250 and the riser 230 have similar cross-sectional shapes, the transition portion 258 may be shaped as a frustum. For example, for an embodiment of a fluid catalytic reactor 200 comprising a cylindrical lower reactor portion 250 and cylindrical riser 230, the transition portion 258 may be shaped as a conical frustum. However, it should be understood that a wide variety of lower reactor portion 250 shapes are contemplated herein which connect various shapes and sizes of lower reactor portions 250 and risers 230.

In operation, the catalyst may move upward through the riser 230 (from the lower reactor portion 250), and into the separation device 220. The separated vapors may be removed from the fluid catalytic reactor system 102 via a pipe 120 at a gas outlet port 216 of the catalyst separation section 210. According to one or more embodiments, the separation device 220 may be a cyclonic separation system, which may include two or more stages of cyclonic separation. In embodiments where the separation device 220 comprises more than one cyclonic separation stages, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), $LD_2$ (commercially available from Stone and Webster), and $RS_2$ (commercially available from Stone and Webster). Primary cyclones are described, for example, in U.S. Pat. Nos. 4,579,716; 5,190,650; and 5,275,641, which are each incorporated by reference in their entirety herein. In some separation systems utilizing primary cyclones as the primary cyclonic separation device, one or more set of additional cyclones, e.g. secondary cyclones and tertiary cyclones, are employed for further separation of the catalyst from the product gas. It should be understood that any primary cyclonic separation device may be used in embodiments of the invention.

According to one or more embodiments, following separation from vapors in the separation device 220, the catalyst may generally move through the stripper 224 to the catalyst outlet port 222 where the catalyst is transferred out of the fluid catalytic reactor 200 via standpipe 126 and into the regeneration section 300. Optionally, the catalyst may also be transferred directly back into the lower reactor portion 250 via standpipe 122. Alternatively, the catalyst may be premixed with regenerated catalyst in the transport riser 130.

Referring now to the regeneration section 300, as depicted in FIG. 1, the combustor 350 of the regeneration section 300 may include one or more lower reactor portion inlet ports 352 and be in fluid communication with the riser 330. The combustor 350 may be in fluid communication with the catalyst separation section 210 via standpipe 126, which may supply spent catalyst from the fluid catalytic reactor 200 to the regeneration section 300 for regeneration. The combustor 350 may include an additional lower reactor portion inlet port 352 where air inlet 128 connects to the combustor 350. The air inlet 128 may supply reactive gases which may react with the spent catalyst to at least partially regenerate the catalyst. For example, the catalyst may be coked following the reactions in the lower reactor portion 250, and the coke may be removed from the catalyst (i.e., regenerating the catalyst) by a combustion reaction. For example, oxidizer (such as air) may be fed into the combustor 350 via the air inlet 128. Following combustion, the regenerated catalyst may be separated in the catalyst separation section 310 and delivered back into the fluid catalytic reactor 200 via standpipe 124.

Figure 2:
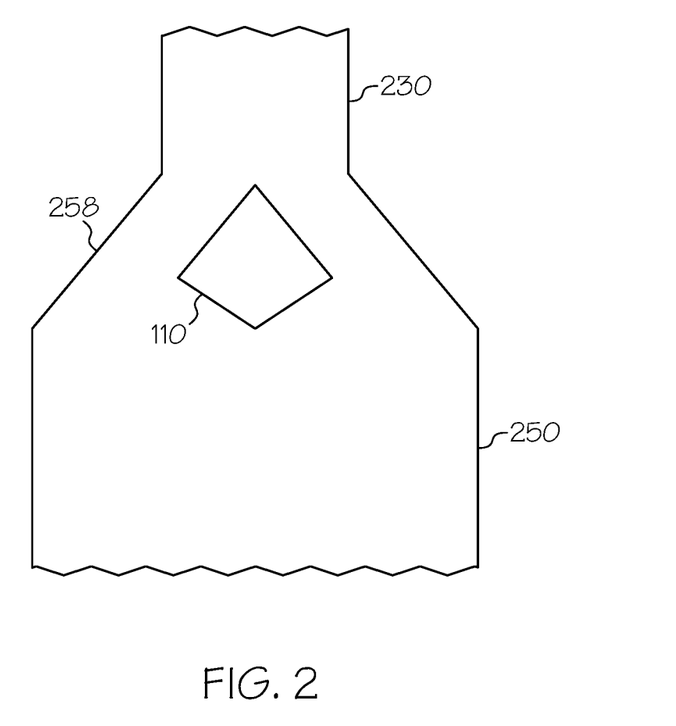
FIG. 2 schematically depicts a cross-sectional side view of a portion of a scaled-up fluid catalytic reactor that includes a flow director, according to one or more embodiments disclosed herein.

FIG. 2 depicts an enlarged view of a portion of the fluid catalytic reactor 200 of FIG. 1 in a scaled-up embodiment. As depicted in FIG. 2, a lower reactor portion 250 is connected to a riser 230 with the transition portion 258. The cross-sectional area of the riser 230 may be less than the cross-sectional area of the lower reactor portion 250 such that the transition portion 258 is tapered inward from the lower reactor portion 250 to the riser 230. The flow director 110 is positioned at least within an interior region of the transition portion 258. The flow director 110 may comprise a body which affects the velocity profile of fluids moving from the lower reactor portion 250 to the riser 230. In some embodiments, the flow director may be positioned at the axial center of the transition portion 258. It should be appreciated that the cross-sectional view of FIG. 2 may be interpreted to depict a cross-section of an axially symmetric system. For example, the riser 230 and lower reactor portion 250 may be cylindrical (i.e., having circular cross-sections) and the transition portion 258 may be a conical frustum (i.e., having circular cross-sections). As such, the flow director 110 as depicted in FIG. 2 may be interpreted as a body formed by two conical structures with adjoined bases. It should be understood, however, that other shapes for the flow director 100 are contemplated herein.

Figure 4A:
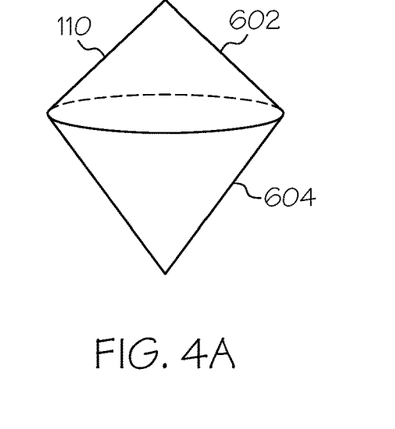
FIG. 4A schematically depicts a perspective view of a flow director, according to one or more embodiments disclosed herein.
Figure 4B:
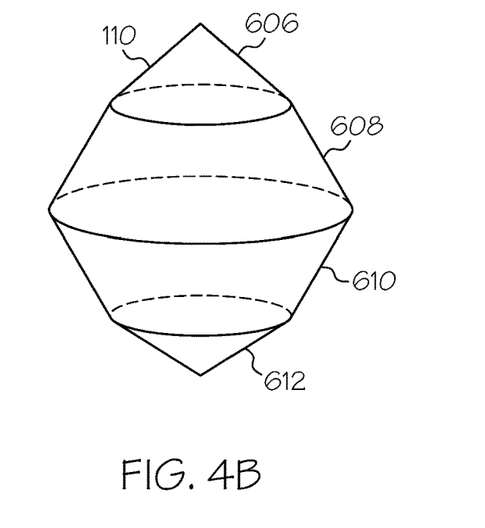
FIG. 4B schematically depicts a perspective view of a flow director, according to one or more embodiments disclosed herein.

FIG. 4A depicts a schematic perspective "3D" view" of the flow director 110 depicted in FIG. 2 comprising a first conical structure 602 and a second conical structure 604. In such an embodiment, the base of the first conical structure 602 and the base of the second conical structure 604 may have the same shape and size. As described, other shapes are contemplated, such as depicted in FIG. 4B. The flow director 110 of FIG. 4B includes an upper conical structure 606, a first conical frustum structure 608, a second conical frustum structure 610, and a lower conical structure 612. The upper conical structure may share a base with the first conical frustum structure 608, the first conical frustum 608 may share a base with the second conical frustum structure 610, and/or the lower conical structure 612 may share a base with the second conical frustum structure 610. In other embodiments, such as that depicted in FIG. 4C, the flow director 110 may have an irregular shape. For example irregular shapes may be utilized when flow directors 110 are designed for a particular scale-up embodiment, as is explained herein.

Figure 4C:
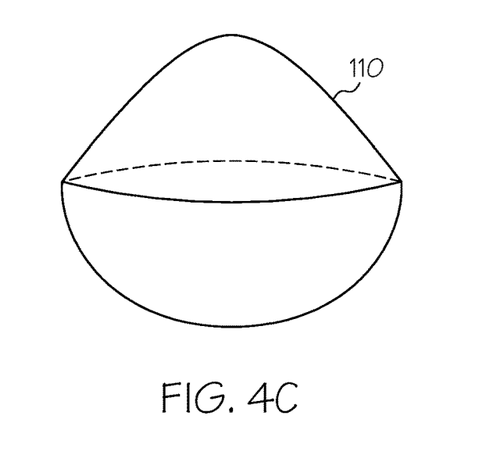
FIG. 4C schematically depicts a perspective view of a flow director, according to one or more embodiments disclosed herein.

In one or more embodiments, the flow director 110 may be a solid body, or may alternatively be a hollow object. The flow director 100 may comprise stainless steel such as 304H SS. The flow director 110 may additionally comprise refractory materials on the outer surface of the flow director 110 or at least partially filling the inside of a hollow flow director 110.

In one or more embodiments, the flow director 110 may be held in position in the transition portion 580 by one or more mechanical supports. Numerous mechanical support systems are contemplated herein, such as wires, poles, brackets, or other like means. For example, in one embodiment, I-beams or T-beams may be suspended across a portion of the fluid catalytic reactor 200 to support the flow director 110. An embodiment of a support system which could be adapted to support the flow directors 110 described herein is described in U.S. patent application Ser. No. 14/751,424, entitled "A Fluid Solids Contacting Device," which is incorporated by reference herein in its entirety.

Figure 3:
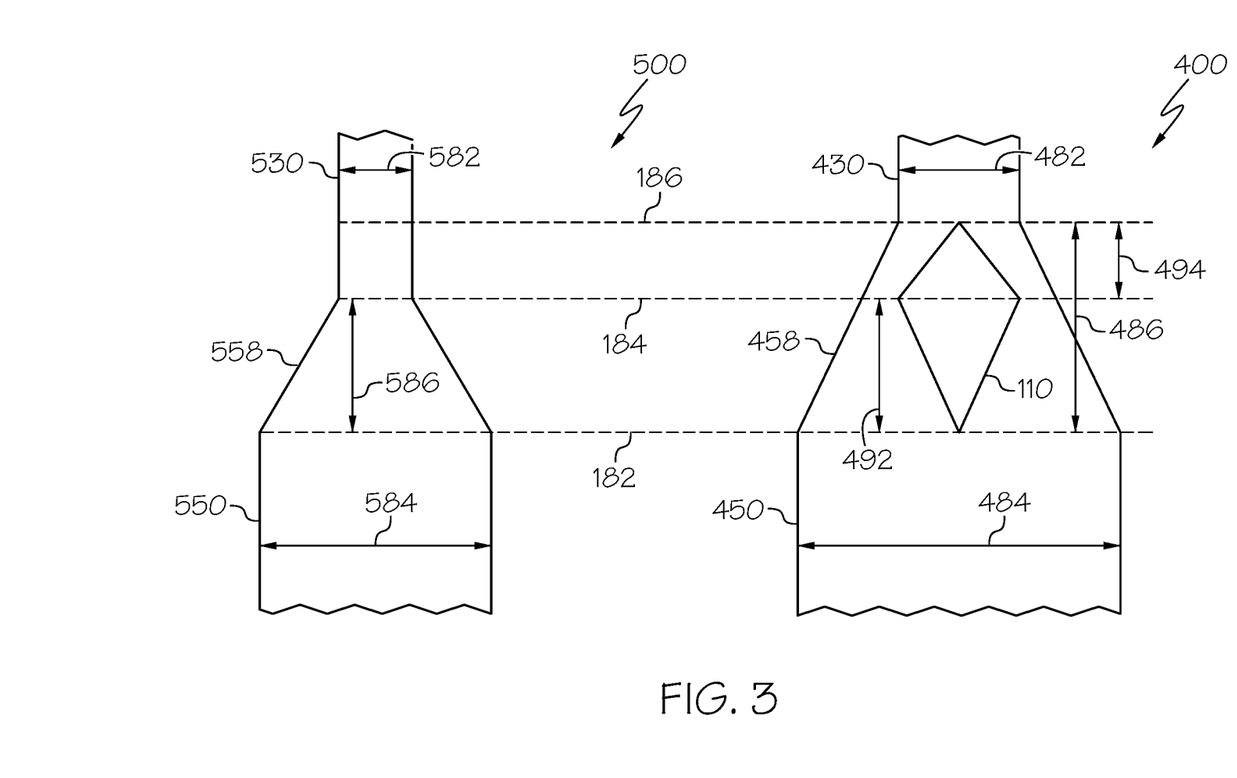
FIG. 3 schematically depicts a cross-sectional side view of a portion of a template fluid catalytic reactor and a portion of a scaled-up fluid catalytic reactor that includes a flow director, according to one or more embodiments disclosed herein.

The scale-up procedure is depicted schematically in FIG. 3, which shows a template fluid catalytic reactor 500 and a scaled-up fluid catalytic reactor 400 aligned such that the interface of the template lower reactor portion 550 and the template transition portion 558 is co-planar with the interface of the scaled-up lower reactor portion 450 and the template transition portion 558. These co-planar interfaces are represented by line 182. Additionally, line 184 represents the plane of the interface of the template transition portion 558 and the template riser 530, and line 186 represents the plane of the interface of the scaled-up transition portion 458 and the scaled-up riser 430.

While the scaled-up fluid catalytic reactor 400 of FIG. 3 is described herein as having a conical frustum shaped scaled-up transition portion 458, a cylindrically shaped scaled-up lower reactor portion 450, and a cylindrically shaped scaled-up riser 430, it should be appreciated that the scale-up procedure can be adapted to fluid catalytic reactors having different shapes. Likewise, while the template fluid catalytic reactor 500 of FIG. 3 is described herein in the context of a template fluid catalytic reactor 500 having a conical frustum shaped template transition portion 558, a cylindrically shaped template lower reactor portion 550, and a cylindrically shaped template riser 530, it should be appreciated that the scale-up procedure can be adapted to fluid catalytic reactors having different shapes.

Still referring to FIG. 3, the template lower reactor portion 550 has a width 584 (e.g., a diameter when the template lower reactor portion 550 has a circular cross-section), the template riser 530 has a width 582 (e.g., a diameter when the template riser 530 has a circular cross-section), and the template transition portion 558 has a height 586 measured as the distance between the bottom of the template riser 530 and the top of the template lower reactor portion 550. Similarly, the scaled-up lower reactor portion 450 has a width 484 (e.g. a diameter), the scaled-up riser 430 has a width 482 (e.g., a diameter), and the scaled-up transition portion 458 has a height 486 measured as the distance between the bottom of the scaled-up riser 430 and the top of the scaled-up lower reactor portion 450. Additionally, the difference in height 586 and height 486 is represented as height 494, covering the region of the scaled-up transition portion which is taller than the height 586 of the template transition portion 558.

As described herein, the scaled-up fluid catalytic reactor 400 is generally a larger version of the template fluid catalytic reactor 500. The various components of the template fluid catalytic reactor 500 may be scaled-up by a scale-up factor. For example, the ratio of the cross-sectional area of the scaled-up riser 430 to the cross-sectional area of the template riser 530 may be from 80% to 120% of a scale-up factor. Additionally, the ratio of the cross-sectional area of the scaled-up lower reactor portion 450 to the cross-sectional area of the template lower reactor portion 550 may be from 80% to 120% of the scale-up factor. According to additional embodiments, the ratio of the cross-sectional area of the scaled-up riser 430 to the cross-sectional area of the template riser 530 may be from 85% to 115% of the scale-up factor, from 90% to 110% of the scale-up factor, from 95% to 105% of the scale-up factor, from 98% to 102% of the scale-up factor, or even from 99% to 101% of the scale-up factor. According to additional embodiments, and the ratio of the cross-sectional area of the scaled-up lower reactor portion 450 to the cross-sectional area of the template lower reactor portion 550 may be from 85% to 115% of the scale-up factor, from 90% to 110% of the scale-up factor, from 95% to 105% of the scale-up factor, from 98% to 102% of the scale-up factor, or even from 99% to 101% of the scale-up factor.

According to one or more embodiments, the scale-up factor may be at least 1.3, at least 1.4, at least 1.5, at least 1.6. at least 1.7, at least 1.8, at least 1.9, at least 2, at least 2.5, at least 3, at least 3.5, at least 4, at least 4.5, at least 5, at least 6, at least 7, at least 8, at least 9, or even at least 10. In one or more embodiments, the scale up factor may be from 1.3 to 5, from 2 to 4, or from 2.5 to 3.5.

According to embodiments described herein, the general shape of the template transition portion 558 may be utilized for the scaled-up transition portion 458. For example the angle of taper 588 of the template transition portion 558 may be within 20% of the angle of taper 488 of the scaled up transition portion 458. For example taper angle 558 may be from 80% to 120% of taper angle 488, from 85% to 115% of taper angle 488, from 90% to 110% of taper angle 488, from 95% to 105% of taper angle 488, from 98% to 102% of taper angle 488, or even from 99% to 101% of taper angle 488.

As described herein, various components of the template fluid catalytic reactor 500 and the scaled-up fluid catalytic reactor 400 have "flow areas." The flow area may generally correspond to the area in which a fluid can pass upwards in a given component. In components which may have a relatively constant cross-sectional area, the flow area is relatively constant with respect to height. For example, the template lower reactor portion 550, the template riser 530, the scaled-up lower reactor portion 450, and the scaled-up riser 430 may have flow areas which are not a function of height, whereas the template transition portion 558 and the scaled-up transition portion 458 may have a flow area that is a function of height.

The template transition portion 558 comprises a template transition portion flow area for each height of the template transition portion 558. As used herein, the "template transition portion flow area" at a height refers to the cross-sectional area of the template transition portion 558 at that height. For example, for a height at the bottom the template transition portion 558 (at line 182) the template transition portion flow area is equal to the cross section area of the template lower reactor portion 550, and for a height at the top of the template transition portion 558 (at line 184) the template transition portion flow area is equal to the cross sectional area of the template riser 530. The template riser 530 comprises a template riser flow area which is equal to the cross-sectional area of the template riser 530. The template lower reactor portion 550 comprises a template lower reactor portion flow area which is equal to the cross-sectional area of the template lower reactor portion 550.

In one or more embodiments, a template flow-path ratio may be determined for the template fluid catalytic reactor 500. As used herein, the "template flow-path ratio" for a height refers to the ratio of a flow area at a height in the template transition portion 558 or template riser 530 to the template lower reactor portion flow area. For example, for heights less than the height 586 of the template transition portion 558, the template flow-path ratio equals the ratio of (a) the template transition portion flow area at the height to (b) the template lower reactor portion flow area (i.e., the cross-sectional area of the template lower reactor portion). For heights greater than the height of the template transition portion 558, the template flow-path ratio equals the ratio of the template riser flow area (i.e., the cross-sectional area of the template riser 530) to the template lower reactor portion flow area (i.e., the cross-sectional area of the template lower reactor portion).

The scaled-up transition portion 458 may comprise a scaled-up transition portion flow area for each height of the scaled-up transition portion 458. As used herein, the "scaled-up transition portion flow area" at a height refers to the cross-sectional area of the transition portion at the height minus the cross-sectional area of the flow director 110 at the height. The flow director 110 reduces the flow area of the scaled-up transition portion 458. The scaled-up riser 430 comprises a scaled-up riser flow area which is equal to the cross-sectional area of the scaled-up riser 430. The scaled-up lower reactor portion 450 comprises a scaled-up lower reactor portion flow area which is equal to the cross-sectional area of the scaled-up lower reactor portion 450.

In one or more embodiments, a scaled-up flow-path ratio may be determined for the scaled-up fluid catalytic reactor 400. As used herein, the "scaled-up flow-path ratio" for a height refers to the ratio of a flow area at a height in the scaled-up transition portion 458 to the scaled-up lower reactor portion flow area. For example, the scaled-up flow path ratio for a height may refer to the ratio of (a) the scaled-up transition portion flow area at that height to (b) the scaled-up lower reactor portion flow area (i.e., the cross-sectional area of the scaled-up lower reactor portion 450).

According to embodiments described herein, for one or more heights as measured from line 182 (i.e., the base of the scaled-up transition portion 458), the scaled-up flow-path ratio may be from 70% to 130% of the template flow-path ratio, such as from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

In one embodiment, the scaled-up flow-path ratio may be from 70% to 130% of the template flow-path ratio at the height of the template transition portion 558 (line 184) on the scaled-up transition portion 458. For example, at the height of the template transition portion 558 on the scaled-up transition portion 458, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

In one embodiment, the scaled-up flow-path ratio may be from 70% to 130% of the template flow-path ratio at the midpoint of the height 486 of the scaled-up transition portion 458. For example, at the midpoint of the height 486 of the scaled-up transition portion 458, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

According to another embodiment, the scaled-up flow-path ratio may be from 70% to 130% of the template flow-path ratio at a height 25% of the height 486 of the scaled-up transition portion 458. For example, at a height 25% of the height 486 of the scaled-up transition portion 458, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

According to another embodiment, the scaled-up flow-path ratio may be from 70% to 130% of the template flow-path ratio at a height 75% of the height 486 of the scaled-up transition portion 458. For example, at a height 75% of the height 486 of the scaled-up transition portion 458, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

According to another embodiment, the scaled-up flow-path ratio may be from 70% to 130% of the template flow-path ratio for all heights less than the height 492 of the template transition portion 558. For example, for all heights less than the height 586 of the template transition portion 558, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

According to another embodiment, the scaled-up flow-path ratio may be from 70% to 130% of the template flow-path ratio for all heights greater than the height 586 of the template transition portion 558 (heights of 494). For example, for all heights greater than the height 586 of the template transition portion 558, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

According to another embodiment, the scaled-up flow-path ratio may be from 70% to 130% of the template flow-path ratio for all heights of the scaled-up transition portion 458. For example, for all heights of the scaled-up transition portion 458, the scaled-up flow-path ratio may be from 70% to 130% of the template flow-path ratio, from 75% to 125% of the template flow-path ratio, from 80% to 120% of the template flow-path ratio, from 85% to 115% of the template flow-path ratio, from 90% to 110% of the template flow-path ratio, from 95% to 105% of the template flow-path ratio, from 98% to 102% of the template flow-path ratio, or from 99% to 101% of the template flow-path ratio.

It should be understood that the flow director 110 may be designed to satisfy one or more of the embodiments related to the flow-path ratios described herein. It has been found that when the scaled-up flow-path ratio is similar (e.g., from 70% to 130%) to the template flow-path ratio, the fluid velocity profile in the upward direction is maintained in the scaled-up fluid catalytic reactor 400 relative to the template fluid catalytic reactor 500. In one embodiment, a body comprising two cones with adjoined bases may be utilized as the flow director 110. For example, it should be appreciated that the portion of a flow director 110 with the cone bases may be at the same height relative to the bottom of the scaled-up transition portion 458 (i.e., line 182) as the top of the template transition portion 558 (i.e., line 184) relative to the bottom of the template transition portion 558 (i.e., line 182). It should be understood that modeling of various reactor scale-up architectures may yield complex three-dimensional shapes for the flow director 110 when the scaled-up flow-path ratio is about equal to the template flow-path ratio for all heights of the scaled-up transition portion 458. However, these complex shapes can be estimated utilizing non curved polygons, or frustum structures and cones. For example, FIG. 4C depicts an embodiment of such a complex shaped flow director 110 designed to be placed in a scaled-up frustum shaped transition portion.

Now referring to FIG. 2, according to one or more embodiments, the flow director 110 may fill a substantial portion of the volume of the transition portion 258. For example, the flow director 110 may fill at least 10%, at least 20%, at least 30%, at least 40% or even at least 50% of the volume of the transition portion 258. In additional embodiments, the flow director 110 may fill from 10% to 50%, or from 20% to 45% of the volume of the transition portion 258.

The systems described herein may be utilized as processing equipment for various fluidized catalyst reactions. For example, hydrocarbons, as well as other chemical feedstocks, can be converted into desirable products through use of fluidized bed reactors. Fluidized bed reactors serve many purposes in industry, including dehydrogenation of paraffins and/or alkyl aromatics, cracking of hydrocarbons (i.e., fluid catalytic cracking), production of olefins from methanol, dehydration of alcohols, chlorination of olefins, oxidations of naphthalene to phthalic anhydride, production of acrylonitrile from propylene, ammonia, and oxygen, Fischer-Tropsch synthesis, and polymerization of ethylene.

According to the embodiments described, the scaled-up fluid catalytic reactor may be constructed or operated. As described herein, constructing a scaled-up fluid catalytic reactor 400 may refer to building or otherwise connecting or attaching reactor components to form a scaled-up fluid catalytic reactor 400. Additionally, operating a scaled-up fluid catalytic reactor 400 may refer to controlling the scaled-up fluid catalytic reactor 400 such as to operate one or more chemical reactions to form a product from a reactant in the scaled-up fluid catalytic reactor 400.

Additionally, the scaled-up fluid catalytic 400 reactor may be "based-on" a template fluid catalytic reactor 500. In one or more embodiments, one may not necessarily possess the actual template fluid catalytic reactor 500. For example, the template fluid catalytic reactor 500 may be observed, such as perceived, in person or otherwise, either in operation or otherwise. Observing may include collecting data related to the operation of the template fluid catalytic reactor 500. In another embodiment, data related to a template fluid catalytic reactor 500 may be obtained, which may include acquiring any information related to the operation of the template fluid catalytic reactor 500. For example, obtaining data related to the template fluid catalytic reactor 500 may include acquiring information related to the reaction rates, fluid mechanics, process conditions, etc., in a template fluid catalytic reactor 500. For example, obtaining a publication disclosing the design and/or operational parameters of a template fluid catalytic reactor 500 may be included as an act of obtaining data related to the template fluid catalytic reactor 500. In one or more embodiments, data related to the template reactor 500 may include one or more of the cross-sectional area of the template riser 530, the cross-sectional area of the template lower reactor portion 550, the cross-sectional shape of the template riser 558, the cross-section shape of the template lower reactor portion 550, or the shape of the template transition portion 558 (such as the angle of a conical frustum shape).

It should be understood that, while some embodiments of the fluid catalytic reactors described herein are scaled-up from templates, in some embodiments, the fluid catalytic reactors that include flow directors may be original reactors (i.e., not be scaled-up). It should be appreciated that flow directors, as described herein, may be utilized in contexts other than scale-up, such as the modification of a reactor. For example, modifying a reactor by the inclusion of a flow director may be desirable to change processing parameters in a reaction.

For the purposes of describing and defining the present invention it is noted that the term "about" are utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Generally, "inlet ports" and "outlet ports" of any system unit of the fluid catalytic reactor system 102 described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit of the fluid catalytic reactor system 102 to which a pipe, conduit, tube, hose, transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A fluid catalytic reactor comprising:
a riser comprising a cross-sectional area;
a lower reactor portion comprising a cross-sectional area;
a transition portion attaching the riser to the lower reactor portion, wherein the cross-sectional area of the riser is less than the cross-sectional area of the lower reactor portion such that the transition portion is tapered inward from the lower reactor portion to the riser; and
a flow director positioned at least within an interior region of the transition portion, wherein the flow director affects the velocity profile of fluids moving from the lower reactor portion to the riser, wherein one or more portions of the flow director have a smaller cross-sectional area than the riser.

2. The fluid catalytic reactor of claim 1, wherein the flow director fills at least 10% of a volume of the transition portion.

3. The fluid catalytic reactor of claim 1, wherein the flow director fills at least 20% of a volume of the transition portion.

4. The fluid catalytic reactor of claim 1, wherein the flow director fills from 20% to 45% of a volume of the transition portion.

5. The fluid catalytic reactor of claim 1, wherein the flow director comprises a conical structure.

6. The fluid catalytic reactor of claim 1, wherein the flow director comprises a frustum structure.

7. The fluid catalytic reactor of claim 1, wherein the transition portion comprises a frustum shape.

8. The fluid catalytic reactor of claim 1, wherein the transition portion comprises a conical frustum shape.

9. A fluid catalytic reactor comprising:
a riser comprising a cross-sectional area;
a lower reactor portion comprising a cross-sectional area;
a transition portion attaching the riser to the lower reactor portion, wherein the cross-sectional area of the riser is less than the cross-sectional area of the lower reactor portion such that the transition portion is tapered inward from the lower reactor portion to the riser; and
a flow director positioned at least within an interior region of the transition portion, wherein the flow director affects the velocity profile of fluids moving from the lower reactor portion to the riser,
wherein one or more of:
the flow director comprises a conical structure;
the flow director comprises a frustum structure;
the transition portion comprises a frustum shape; or
the transition portion comprises a conical frustum shape.

10. The fluid catalytic reactor of claim 9, wherein the flow director comprises a conical structure.

11. The fluid catalytic reactor of claim 9, wherein the flow director comprises a frustum structure.

12. The fluid catalytic reactor of claim 9, wherein the transition portion comprises a frustum shape.

13. The fluid catalytic reactor of claim 9, wherein the transition portion comprises a conical frustum shape.

14. The fluid catalytic reactor of claim 9, wherein the flow director fills at least 10% of a volume of the transition portion.

15. The fluid catalytic reactor of claim 9, wherein the flow director fills from 20% to 45% of a volume of the transition portion.

* * * * *